United States Patent [19]

Katsumata

[11] 3,974,815

[45] Aug. 17, 1976

[54] SIGNAL SOURCE FOR USE IN A BREAKERLESS IGNITION SYSTEM FOR AN INTERNAL COMBUSTION ENGINE

[75] Inventor: Mitsuo Katsumata, Numazu, Japan

[73] Assignee: Kokusan Denki Co., Ltd., Numazu, Japan

[22] Filed: Feb. 3, 1975

[21] Appl. No.: 546,729

[30] Foreign Application Priority Data

Feb. 6, 1974  Japan.............................. 49-15245

[52] U.S. Cl..................... 123/148 CC; 123/117 R; 123/179 BG
[51] Int. Cl.² ......................... F02P 5/04; F02P 1/00
[58] Field of Search ................ 123/117 R, 146.5 A, 123/148 MC, 179 BG

[56] References Cited
UNITED STATES PATENTS

| | | | |
|---|---|---|---|
| 3,398,353 | 8/1968 | Noddin et al............... | 123/148 MC |
| 3,465,739 | 9/1969 | Burson....................... | 123/148 MC |
| 3,500,809 | 3/1970 | Hohne et al................ | 123/148 MC |
| 3,619,634 | 12/1971 | Burson....................... | 123/148 MC |
| 3,630,185 | 12/1971 | Struber et al............... | 123/148 MC |
| 3,661,132 | 5/1972 | Farr............................ | 123/148 MC |
| 3,768,455 | 10/1973 | Imhof......................... | 123/148 MC |

Primary Examiner—Charles J. Myhre
Assistant Examiner—Ronald B. Cox
Attorney, Agent, or Firm—Woodling, Krost, Granger & Rust

[57] ABSTRACT

A signal source for use in a breakerless ignition system for an internal combustion engine, comprising a stator having a plurality of normally igniting signal coils arranged so that they produce respective ignition timing signals at respective ignition points slightly different from each other, said normally igniting signal coils being operatively associated with a breakerless ignition system so that the ignition timing signals are supplied thereto and having said respective ignition timing signals selectively applied in response to increase in the revolution number of an internal combustion engine, said signal source characterized by further comprising a starting signal coil positioned to produce a starting signal at the ignition point advanced in phase relative to some of said normally igniting signal coils relatively retarded in phase and operated when said engine is started at a relatively lower speed, said starting signal coil operatively associated with said breakerless ignition system so that said starting signal is supplied thereto; and switching means associated with said starting signal coil to by-pass said signal from said ignition system when the starting of said engine is completed.

8 Claims, 4 Drawing Figures

SIGNAL SOURCE FOR USE IN A BREAKERLESS IGNITION SYSTEM FOR AN INTERNAL COMBUSTION ENGINE

BACKGROUND OF THE INVENTION

In general, in an internal combustion engine such as a reciprocating or piston engine or a rotary engine, an ignition point of the engine has been controlled so that a desired advance characteristics can be obtained in response to the revolution speed of the engine. By way of example, since the reciprocating engine has the relatively lower motion speed of the piston when it is started and also since gas leakage occurs between the piston and the cylinder when it is started, the inner pressure in the cylinder tends to have the highest value at the point before the piston reaches the upper dead point while the crank of the engine is rotating. Accordingly, if the engine is ignited at the point of the piston when the inner pressure in the cylinder has the highest value, the most preferable starting characteristics can be obtained, which is well known in the art. The point of the piston when the inner pressure has the highest value on initiation depends on the speed of rotation of the crank and the condition of the gas leakage. Generally, it is at the angle of 10° to 15° prior to the upper dead point of the piston. After the engine is started, the point of the piston when the inner pressure in the cylinder has the highest value is at the angle of 5° to 7° on idling of the engine because the speed of rotation of the crank increases and because the gas leakage decreases. In the event that load is applied to the engine during high speed rotation thereof, it is required to be ignited at the point of 30° to 50° prior to the upper dead point so that the ignition point is advanced because if otherwise combustion cannot follow the motion of the piston.

A conventional ignition system comprises a governor adapted to angularly shift a contact breaker about a cam shaft so that the ignition point is advanced in phase with increasing speed. The advance characteristic provided by such conventional ignition system is as indicated by the dotted line in FIG. 1. If the governor is designed so that on starting of the engine the ignition point is advanced, then it has a complicated construction and therefore, the desired starting characteristics cannot be practically employed.

A breakerless ignition system to which the present invention is directed has not provided such desired starting characteristics because it is difficult that it is designed in such a manner.

SUMMARY OF THE INVENTION

Accordingly, it is a principal object of the present invention to provide a signal source in use for a breakerless ignition system for an internal combustion engine, wherein the ignition point can be advanced on starting in a desired manner.

It is another object of the present invention to provide a signal source of the just above type wherein on operation at extremely high speed the ignition system can be signalled to ignite the engine point slightly retarded from or close to the upper dead point of the piston so that overrunning of the engine and damage of the piston can be prevented.

One of the features of the present invention is that a signal source comprises, in addition to normally igniting signal coils, a starting signal coil to signal an ignition circuit to ignite an engine on initiation at an ignition point more advanced than that during normal low speed operation of the engine and switching means to bypass the output of starting signal coil when starting is completed.

Another feature of the present invention is that the signal source further comprises means to retard the advance angle by bypassing some of the output of the normally igniting signal coils when the engine reaches more than a predetermined revolution speed.

BRIEF DESCRIPTION OF THE DRAWING

The above and other objects and features of the present invention will be apparent from the detailed description of the preferred embodiment taken along with the accompanying drawing in which.

DETAILED DESCRIPTION OF THE PREFERRED EMBODIMENT

Figure 2:
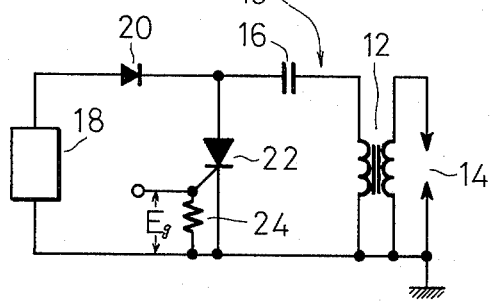
FIG. 2 is a schematic diagram of a capacitance discharge type breakerless ignition system.

Referring now to FIG. 2, there is generally shown a capacitance discharge type ignition system 10 which comprises an ignition coil 12 having a primary coil portion and a secondary coil portion. An ignition plug 14 is connected to the secondary coil portion of the ignition coil 12. A capacitance 16 may be provided in series to the primary coil portion of the ignition coil 12. An ignition or charging power supply 18 such as a flywheel magneto generator is provided which has the output connected through a forward biased diode 20 to the capacitance 16 so that a charging current flows through the diode 20, the capacitance 16 and the primary coil portion to charge the capacitance. A thyristor 22 may be connected in parallel to the series connection of the primary coil portion and the capacitance 16 so that when it is conductive the capacitance 16 is discharged through the primary coil portion. A resistance 24 is connected between the gate and cathode of the thyristor 22. With the capacitance 16 charged, when an igniting signal $E_g$ is applied across the resistance 24, the thyristor 22 is caused to be conductive and then the capacitance 16 is discharged through the primary coil portion of the ignition coil 12. Thus, a high voltage can be established across the secondary coil portion of the ignition coil 12 so that the ignition plug 14 sparks for ignition of the engine. It will be understood that a desired advance characteristic can be obtained by varying the phase of the igniting signal $E_g$ when it reaches a level at which the thyristor 22 is turned on.

Figure 3:
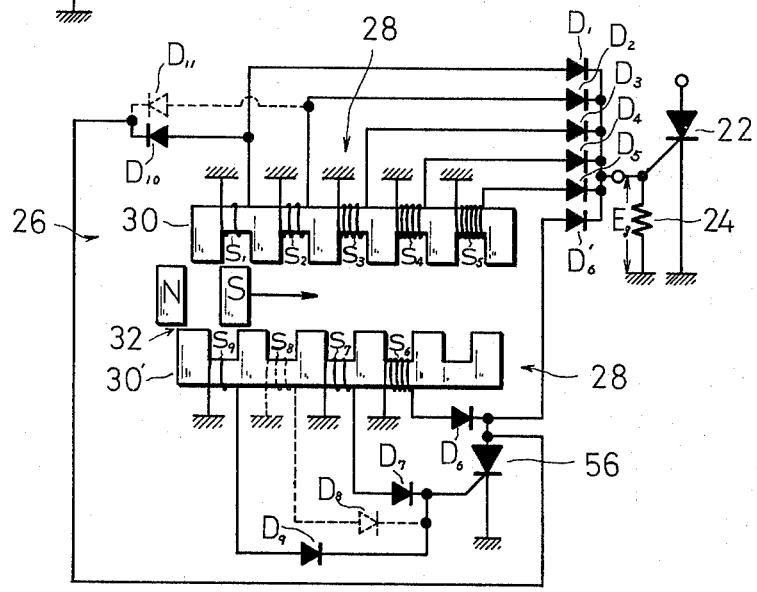
FIG. 3 is schematically illustrative of one embodiment of a signal source of the present invention, which is adapted to be used in the system of FIG. 2.
Figure 4:
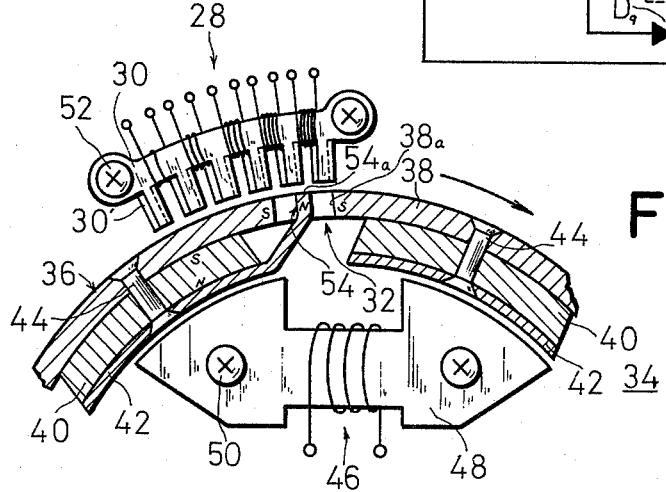
FIG. 4 is a fragmentary cross sectional view of a flywheel type magneto generator provided with the signal source of FIG. 3.

FIG. 3 schematically shows an embodiment of a signal source 26 of the present invention. The signal source may comprise a stator 28 having two comb-like stationary cores 30 and 30' which are arranged so that one of the cores such as 30' is positioned in an advanced relation to the other core 30 in a direction of rotational movement of a rotor 32 which will be described just below. The rotor 32 is shown to comprise two magnetic poles which may be provided by a single permanent magnet. The rotor is driven so that it is synchronized with rotation of the engine. As shown in FIG. 4, the stationary cores 30 and 30' and the rotor 32 may be preferably installed on a magneto generator 34 driven by the engine. The magneto generator may comprise a rotor 36 having a bowl-like magnetic flywheel 38 driven by the engine and a plurality of magnets 40 together with respective pole pieces 42 securely mounted on the inside periphery of the flywheel by respective rivets 44 with only two magnets 40 shown in FIG. 4 and a stator 46 including at least two generating coil means 48 with only one coil means shown, one of which may serve as the charging power supply 18 and the other of which may used as a lighting power supply. As shown in FIG. 4, the two comb-like cores 30 and 30' are disposed adjacent to the outside periphery of the flywheel while they are superposed one upon the other in a direction parallel to the axial direction. The generating coil means 48 and the comb-like cores 30 and 30' may be securely mounted on a stationary base plate (not shown) provided on a crankcase of the engine by means of respective rivets 50 and 52. The flywheel 38 at the cylindrical wall may be provided with a through hole 38a and the pole piece 42 of one of the magnets 40 may have an extension 54 extending through the through hole 38a in a magnetically insulated manner, with the leading end 54a flush with the outside surface of the flywheel 38. It should be noted that the rotor 32 of the signal source comprises the outside surface of the flywheel which may be of S polarity as shown in FIG. 4 and the extension 54 of the pole piece 42 which may be of N polarity as shown in FIG. 4.

The stator 28 of the signal source comprises a plurality of normally igniting signal coils $S_1$ to $S_5$ which may be wound around portions between adjacent teeth of the retarded comb-like core 30 so that the coil $S_1$ is positioned at the most advanced point and the coil $S_5$ at the most retarded point. The coils $S_1$ to $S_5$ may have respective one ends connected to the ground or the cathode of the thyristor 22 of the ignition system and respective other ends connected through respective forward biased diodes $D_1$ to $D_5$ to the gate of the thyristor. It should be understood that the number of turns of the signal coils $S_1$ to $S_5$ increases towards the more retarded coil as shown in FIG. 4. Therefore, when the engine is operating at low speed or idling, only the normally igniting signal coil $S_5$ having the most turns produces the output signal reaching the level sufficient to turn on the thyristor. As the revolution speed of the engine increases, the more signal coils $S_4$, $S_3$, $S_2$ and $S_1$ sequentially produce the output signals reaching such level and as a result the phase when the thyristor 22 is turned on is steppingly advanced. Thus, it will be noted that the igniting points are sequentially advanced as indicated at $a$, $b$, $c$, $d$, and $e$ in solid line in FIG. 1 as the revolution number of the engine increases.

Figure 1:
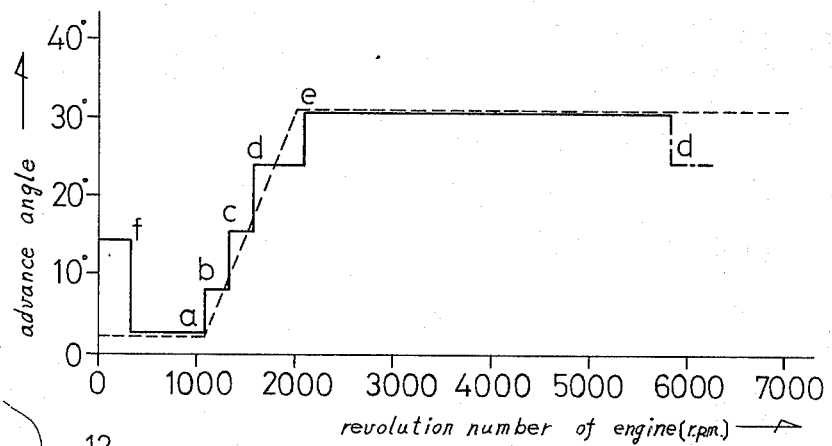
FIG. 1 shows an advance characteristic of a breakerless ignition system wherein a signal source of the present invention is used, together with that of a conventional breaker type ignition system.

The stator 28 of the signal source further comprises a starting signal coil $S_6$ which may be wound around the portion of the advanced comb-like core 30' adjacent to the middle portion. The point where the coil $S_6$ is positioned corresponds to 10° to 15° prior to the upper dead point of the piston and at a point more advanced than the point where the normally igniting coils $S_4$ and $S_5$ are positioned. The starting signal coil $S_6$ may have one end connected to the ground or the cathode of the thyristor 22 and the other end connected through forward biased diodes $D_6$ and $D'_6$ to the gate of the thyristor 22. The number of turns of the initiating signal coil $S_6$ is set so that on starting of the engine it produces an output signal of level sufficient to turn on the thyristor 22. Thus, on starting the output signal from the starting signal coil $S_6$ causes the thyristor 22 to be turned on and therefore, a large advance phase $f$ can be obtained as shown in FIG. 1.

A bypassing switching device such as a thyristor 56 is provided between the ground and the point of junction between the diodes $D_6$ and $D'_6$ in order to bypass the output signal of the starting signal coil $S_6$ from the thyristor 22 after starting of the engine. A bypassing signal coil $S_7$ of less turns than those of the starting signal coil $S_6$ is positioned at a point slightly more advanced than the point at which the coil $S_6$ is positioned and may have one end connected to the ground or the cathode of the thyristor 56 and the other end connected through a forward biased diode $D_7$ to the gate of the thyristor 56. Thus, after starting of the engine, when the revolution speed of the engine reaches a predetermined value of about 400 to 600 r.p.m., for example, the output signal of the bypassing signal coil $S_7$ causes the thyristor 56 to be turned on so that the output signal of the starting signal coil $S_6$ is bypassed or overridden and not passed to the thyristor 22. As a result, thereafter the normally igniting signal coils can be operated so that normal advance of the ignition can be effected as shown in FIG. 1. Thus, as the revolution speed of the engine increases, the advanced phase can be obtained as indicated at $a$ to $e$ of FIG. 1.

Means to retard the ignition point of the engine when it overruns, may be provided which may comprise the thyristor 56 acting as bypassing means, with the signal coil $S_1$ connected through a forward biased diode $D_{10}$ to the anode of the thyristor 56 and an overrunning signal coil $S_9$ wound around the comb-like core 30' in an advanced position relative to the signal coil $S_1$ and having one end connected to the ground and the other end connected through a forwarded diode $D_9$ to the gate of the thyristor 56. It should be noted that the overrunning signal coil $S_9$ has the number of turns determined so that it produces an output signal to turn on the thyristor 56 at more than a predetermined high speed or revolution speed of the engine. With this arrangement, when the revolution speed of the engine reaches the predetermined value, the overrunning signal coil $S_9$ causes the thyristor 56 to be turned on so that the output signal of the signal coil $S_1$ is held from being applied to the igniting thyristor 22. Thus, the advance angle of the ignition is switched from the point $e$ to $d$ as indicated at a dot and dash line in FIG. 1.

It will be noted that when it is required to further retard the ignition point of the engine, a second overrunning signal coil $S_8$ may be provided which is wound around the comb-like core 30' in an advanced position relative to the signal coil $S_2$ and which has one end connected to the ground and has the other end connected through a forward biased diode $D_8$ to the gate of the thyristor 56, as indicated at a dotted line in FIG. 3 while the signal coil $S_2$ is connected through a forward biased diode $D_{11}$ to the anode of the thyristor 56.

It will be understood that a separate switching device may be alternatively provided for retarding the ignition point of the engine when it overruns. It will be also noted that the signal coils $S_7$, $S_8$ and $S_9$ may be alternatively replaced by an alternative signal generating unit such as a taco generator which is adapted to cause the thyristor 56 to be turned on when the engine operates at more than respective revolution speed thereof.

Although one preferred embodiment of the present invention has been illustrated and described with reference to the accompanying drawing, it will be apparent from those skilled in the art that various changes and modifications may be made without departing from the spirit and scope of the present invention. For example, it will be noted that the thyristor 56 may be alternatively replaced by a transistor. It will be also noted that the signal coils $S_1$ to $S_9$ may be alternatively wound around respective cores separated from each other and that the varied air gaps between the respective cores and the rotor of the signal source cause the respective signal coils to produce output signals of different level from each other. It will be understood that the present invention is intended to be defined only by the appended claims.

What is claimed is:

1. A signal source for use in a breakerless ignition system for an internal combustion engine, comprising a rotor having at least one pair of magnetic poles and a stator having a plurality of normally igniting signal coils arranged so that they produce respective ignition timing signals at respective ignition points slightly different from each other, said normally igniting signal coils being operatively associated with a breakerless ignition system so that the ignition timing signals are supplied thereto and having said respective ignition timing signals selectively applied in response to increase in the revolution speed of an internal combustion engine, said signal source characterized by that said stator further comprises a starting signal coil positioned so as to produce a starting signal at an ignition point slightly advanced in phase relative to the ignition timing signals from some of said normally igniting signal coils relatively retarded in phase and operated when said engine is started at a relatively lower speed, said starting signal coil operatively associated with said breakerless ignition system so that said starting signal is supplied thereto; and comprising switching means associated with said starting signal coil to hold said starting signal from said breakerless ignition system when the starting of said engine is completed.

2. A signal source as set forth in claim 1, wherein said normally igniting signal coils are wound around a comb-like core in slightly displaced position to each other in a direction of said rotor.

3. A signal source as set forth in claim 1, wherein said stator of said signal source is positioned adjacent to a magnetic flywheel rotor of a flywheel type magneto generator for said engine and wherein said rotor of said signal source comprises one portion of said magnetic flywheel rotor.

4. A signal source as set forth in claim 3, said magnetic flywheel rotor comprising a bowl-like magnetic flywheel and at least two magnets mounted on the inside periphery of said magnetic flywheel with respective pole pieces mounted on the inside surfaces of said magnets and characterized by that one of said magnetic poles comprises the outside surface of said bowl-like magnetic flywheel and that the other magnetic pole comprises an extension of one of said pole pieces extending through a through hole in said flywheel at the cylindrical wall thereof in a magnetically insulated manner.

5. A signal source as set forth in claim 1, characterized by further comprising means to retard the ignition point of said engine when said engine operates at more than a predetermined high revolution speed.

6. A signal source as set forth in claim 5, wherein said means to retard the ignition point of said engine comprises switching means to override at least one normally igniting signal coil most advanced in position and wherein said stator comprises an overrunning signal coil to turn on said overriding switching means.

7. A signal source as set forth in claim 6, wherein said normally igniting signal coils are wound around a comb-like core in slightly displaced position to each other in a direction of said rotor of said signal source and wherein said starting and overrunning signal coils are wound around another comb-like core superposed on said first-mentioned comb-like core in an advanced position relative thereto, said overrunning signal coil disposed in slightly advanced manner relative to said at least one normally igniting coil.

8. A signal source as set forth in claim 6, wherein said switching means to override at least one normally igniting signal coil comprises said switching means associated with said starting signal coil.

* * * * *